(No Model.)
J. PAGE.
JOINT FOR CAST IRON PIPES.
No. 248,784. Patented Oct. 25, 1881.
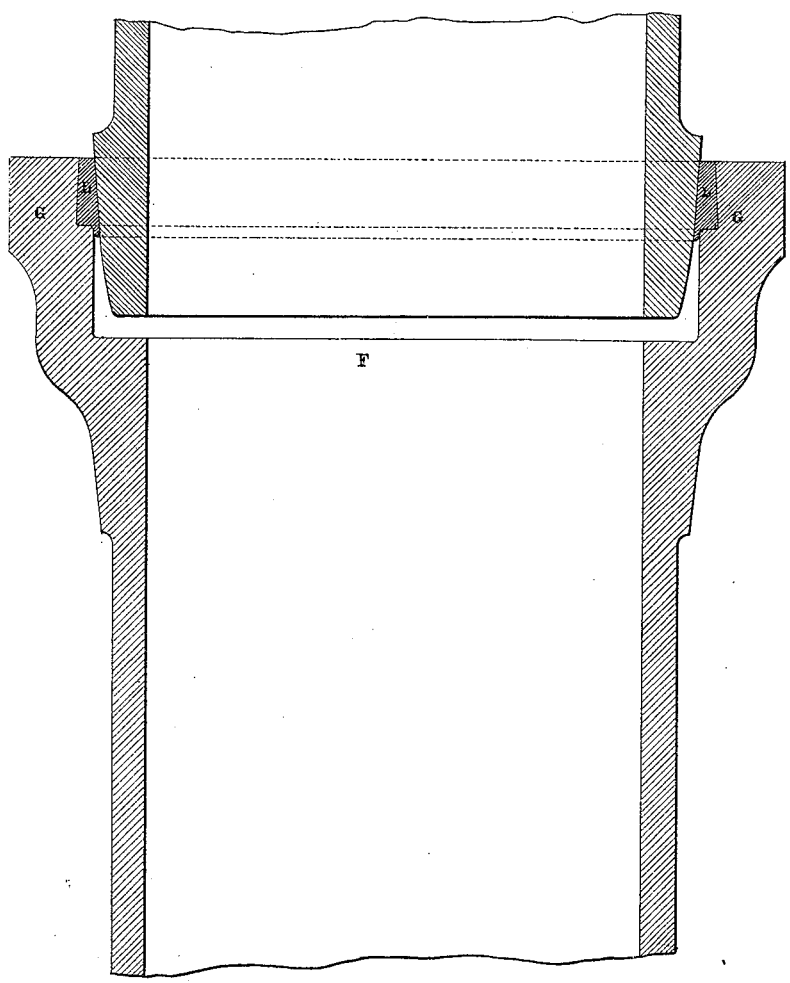 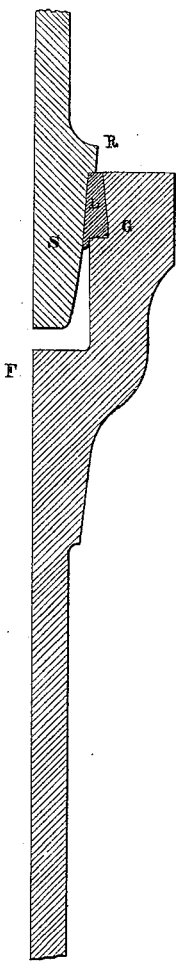
Witnesses
James F Tobin
Harry Smith
Inventors
John Page
by his Attorneys
Howson and Son

UNITED STATES PATENT OFFICE.

JOHN PAGE, OF GLASGOW, COUNTY OF LANARK, SCOTLAND.

JOINT FOR CAST-IRON PIPES.

SPECIFICATION forming part of Letters Patent No. 248,784, dated October 25, 1881.

Application filed January 10, 1881. (No model.) Patented in England September 17, 1880.

*To all whom it may concern:*

Be it known that I, JOHN PAGE, a subject of the Queen of Great Britain, and residing at Glasgow, county of Lanark, Scotland, have invented a certain Improvement in Joints for Cast-Iron Pipes, (for which I applied for a patent in Great Britain, No. 3,773, September 17, 1880,) of which the following is a specification.

My invention relates to certain improvements in that class of pipe-joints which are formed by compressing a separately-prepared lead ring between the spigot and faucet of the adjoining pipe-lengths; and the object of my invention is to so construct such a joint that it will be more water-tight and secure than such joints as heretofore made. This object I attain by forming in the ordinary faucet a special groove for the reception of the soft-metal ring, this groove being preferably undercut or beveled, as more fully described hereinafter.

In the accompanying drawings, Figure 1 is a section of the lead joint-ring; Fig. 2, a section showing the improved joint as formed between the spigot end of one pipe-length and the faucet end of another pipe-length; Fig. 3, a section showing a slight addition, which may be adopted when extra security is considered desirable.

In carrying out my invention the joint-surfaces of the spigot and faucet may be such as are obtainable by the ordinary molding and casting operations, or they may be shaped by turning and boring after the pipes have been cast. The joint-surface of the spigot S is made slightly conical or tapered, as shown, and the faucet F is formed with a shallow groove, G, round the inside of its mouth, such groove G being, by preference, slightly deeper at its inner part, so as to be slightly dovetailed in section.

The lead ring L is shaped like a hoop of tapering thickness, its outside being cylindrical and its inside conical. It is, by preference, of the shape shown in Fig. 1 before the joint is made. When making a joint the lead ring L is placed in the groove G of the faucet F, with its thicker edge innermost, and the spigot S of the next pipe-length is entered and then driven home, as practiced with turned and bored joints. The lead ring L′ becomes expanded by the wedging action of the spigot, so as to completely fill the groove G in the faucet, and then assumes the shape shown in Fig. 2, and forms a perfectly-tight joint. Internal pressure, acting on the lead ring L, can obviously only tend to make it tighter by forcing the lead toward the narrower part of the annular space containing it.

Instead of the surface of the groove G being of a plain slightly-conical form, it may be provided with a number of slight depressions. In cases in which a very great internal pressure has to be provided for, a shoulder or projecting ring, R, may be formed on the spigot S, as shown in Fig. 3. When the shoulder R is adopted the joint-surface of the spigot may be made nearly or quite cylindrical.

The lead rings L may be shaped by casting, by rolling, or by bending a bar rolled or otherwise made of a suitable section. When the lead rings L are made entire they must be made cylindrical, or otherwise small enough to admit of their being entered into the faucet-grooves G. They may, however, be made externally of a form fitting the grooves G, even when these grooves are dovetailed, such rings being cut through at one part to admit of their being gotten into the grooves.

The advantage of providing a special groove, G, for the lead ring, instead of simply adapting the latter to the ordinary tapering faucet, is that a better and more secure joint is thus formed, and this security is added to when such groove is undercut, as described.

I claim as my invention—

1. The combination of the faucet provided with a groove, G, with a separately-made soft-metal ring fitted therein and a tapering spigot adapted to be inserted within the ring, all substantially as set forth.

2. The combination of the faucet provided with an undercut groove, G, with a separately-made soft-metal ring fitted therein and a tapering spigot adapted to be inserted within the ring, all substantially as described.

In testimony whereof I have signed my name to this specification in the presence of two subscribing witnesses.

JOHN PAGE.

Witnesses:
EDMUND HUNT,
DAVID FERGUSON.